Jan. 30, 1962  C. W. SCHMID  3,018,660
METHOD OF AND APPARATUS FOR FLOODING SAMPLE CORES
TAKEN FROM OIL-BEARING ROCK STRATA
Filed June 4, 1956  2 Sheets-Sheet 2
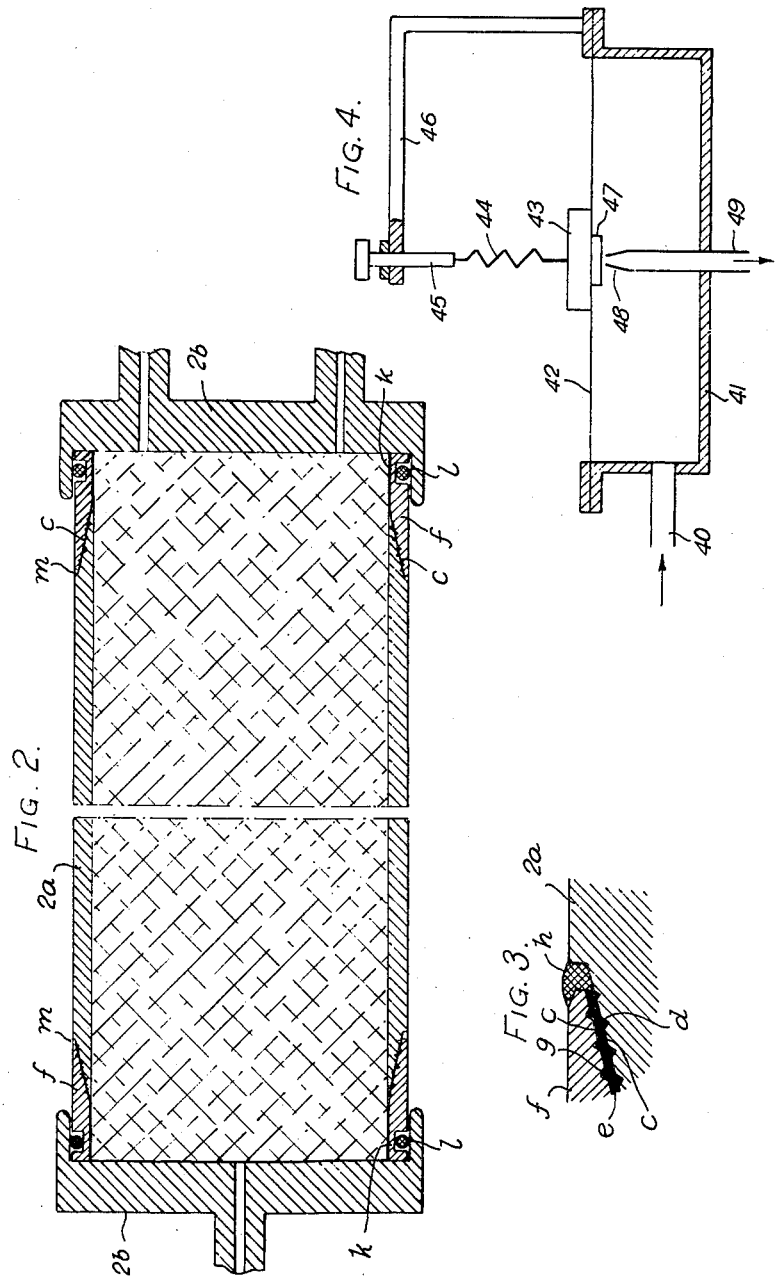
INVENTOR
Christoph W. Schmid
By Morris & Bateman
ATTORNEYS

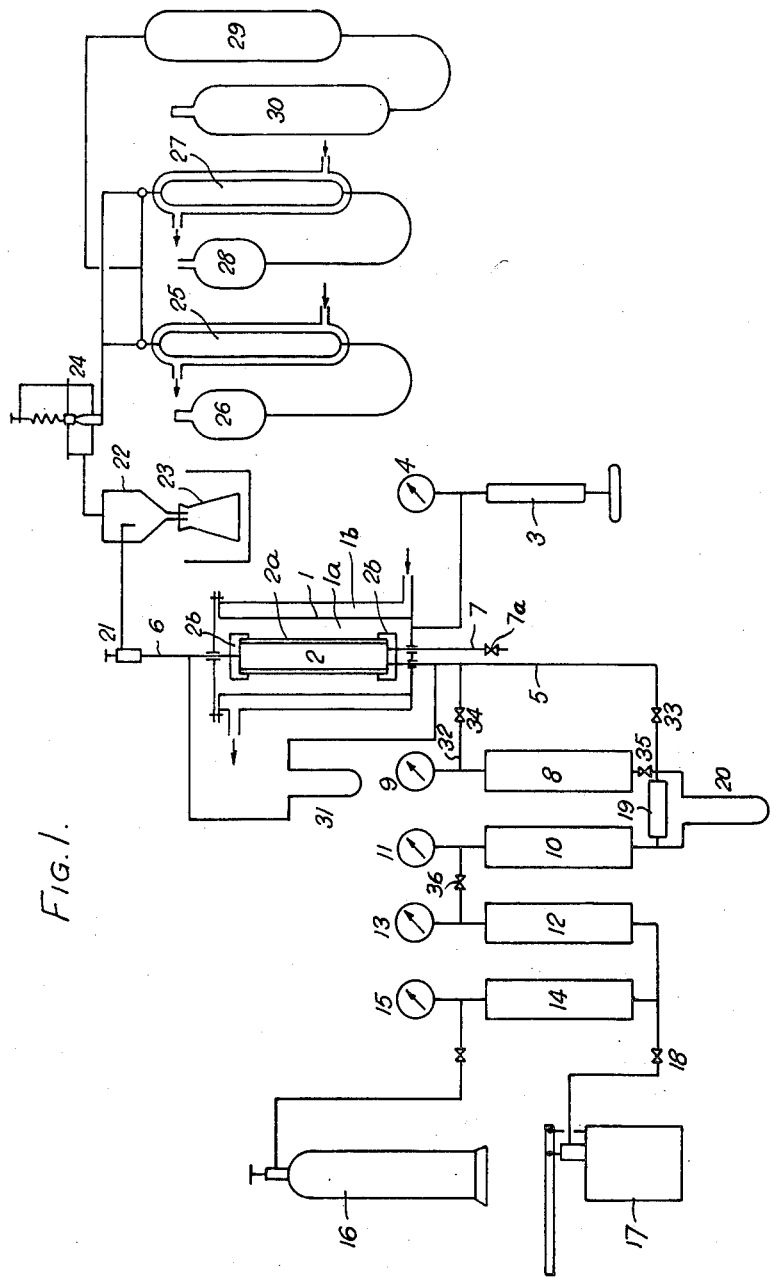

United States Patent Office 3,018,660
Patented Jan. 30, 1962

3,018,660
METHOD OF AND APPARATUS FOR FLOODING SAMPLE CORES TAKEN FROM OIL-BEARING ROCK STRATA
Christoph W. Schmid, Wietze, Kreis Celle, Germany, assignor to Deutsche Erdöl-Aktiengesellschaft, Hamburg, Germany
Filed June 4, 1956, Ser. No. 589,067
Claims priority, application Germany June 7, 1955
7 Claims. (Cl. 73—153)

The extent to which oil can be removed from a deposit when the supply diminishes can be substantially improved by forcing suitable water under pressure into oil-bearing rock strata. The success of this flooding with water depends on many factors, for example, on the speed of the water forced in, the properties of the rock to be flooded, the nature of the liquids (oil or salt water) present in the rock, and the like.

In order to determine the assumptions on which the flooding with water should be based, flooding tests are carried out in the laboratory. These tests consist essentially in forcing water of suitable composition through a sample core obtained by drilling from the rock to be tested, and determining the quantity and composition of the oil so obtained. The influential factors are varied and the experimental conditions especially the pressure and temperature are adjusted to those existing in the strata.

However, the known methods and apparatus used in the laboratory are inadequate for investigating sample cores obtained at depths at which pressures of several hundred atmospheres and temperatures above 100° C. exist. The flooding trials that are to be put into practice can be based only upon results that have been obtained under conditions of test which correspond exactly to those existing in the deposit.

An object of the present invention is to provide a method and apparatus which enable sample cores from promising oil-bearing rock strata to be subjected in the laboratory to flooding tests under the conditions existing in the strata.

In the method of this invention the sample core to be flooded is enclosed within a casing which by expansion adjusts itself to the temperature and pressure variations of the sample core, the sample core thus encased is introduced into a pressure elastic medium which is maintained at a pressure higher than the flooding pressure, the pressure and temperature of the sample core and the temperature of the medium are adjusted to the conditions existing in the deposit, the flooding is carried out and the oil so expelled is collected in a measuring device, in which the gaseous constituents are withdrawn from the main collecting vessel by means of a pressure regulator under constant pressure into a gas collecting vessel.

As stated above, such flooding tests must be carried out under pressures of several hundred atmospheres and at temperatures of about 100° C. A sample core, which is to be subjected to such pressures, must be enclosed by a sufficiently stable protective enclosure, if it is not to break up when the pressure is applied. The changes in shape of the sample core, on the one hand, and of the casing, on the other, that occur when the temperature is raised have hitherto usually led, under the simultaneous influence of the high pressure, either to the crumbling of the sample core and consequently a misleading flooding test or to the bursting of the casing of the sample core. The protective enclosure of the sample core, in accordance with this invention, with an extensible casing that can adjust itself to the pressure and temperature changes of the sample core overcomes those difficulties.

The casing for the sample core may be made of a readily fusible metal alloy. Especially suitable are alloys of bismuth and tin. Under the conditions of test these alloys are plastic, and under the action of external superpressure they lie in complete contact with the outer surface of the core, and they are pore-free and impermeable. At high pressures and temperatures they are also resistant to oil and salt water, and also to aromatic or halogenated hydrocarbons with which the sample core and casing must be extracted after the flooding tests.

In the method of this invention the sample core and casing are placed in a medium which is at a higher pressure than the pressure to which the sample core and the interior of the casing are subjected during flooding. In this manner it is ensured that the casing of low tensile strength does not burst from the inside when the pressure is applied, but remains firmly in contact with the sample core throughout the test. The difference in pressure between the outer and inner surfaces of the casing need not be great, and may be a few atmospheres.

As such a medium any pressure-elastic material may be used, for example, gases such as air, or advantageously liquids, such as oil or the like.

The sample core, casing and medium are placed in an apparatus which enables the system to be brought to the necessary temperature and pressure. Such an apparatus is, for example, an autoclave of known construction capable of being heated.

In order to obtain well-defined experimental results the oil expelled by flooding is collected in a measuring apparatus, which consists of a main measuring vessel and gas collecting flasks which are in communication with one another through a gas pressure regulator. The oil expelled from the sample core under conditions existing within the strata, that is to say, under high temperature and high pressure, is first released to about atmospheric pressure or cooled to 0° C. The gas so released is withdrawn from the gas-oil separator into the gas collecting flasks. This takes place under slightly subatmospheric pressure. By means of a pressure regulator the atmospheric pressure in the gas-oil separator is kept constant, in order that the subatmospheric pressure cannot act also on the separator. In this manner exact and comparable results are obtained.

The method and apparatus of the invention are described by way of example with reference to the accompanying drawings, in which FIGURE 1 is a general view of the apparatus shown diagrammatically, FIGURE 2 is a longitudinal central cross-section through the sample core enclosed within the casing and connecting caps, FIGURE 3 shows on an enlarged scale a portion of the casing shown in FIGURE 2, and FIGURE 4 is a cross-section of the the pressure regulator shown in FIGURE 1.

FIGURE 1 shows the apparatus used for carrying out flooding tests under conditions existing in the strata. The important part of the apparatus is a high pressure vessel 1 of which the temperature can be regulated by means of a jacket 1b through which a heating liquid, for example, a mineral oil, is passed. Within the pressure vessel 1 is located the sample core 2 of rock to be tested, the core 2 being enclosed within an extensible casing 2a. The space 1a between the casing 2a and the pressure vessel 1 is filled with mineral oil, and by means of a manually operated piston pump 3 the pressure of the oil medium in the space 1a is maintained constantly higher than the pressure within the core of rock.

A pressure gauge 4 measures the pressure in the space 1a. The liquids to be passed through the core are supplied through a conduit 5 and led away through a conduit 6. The conduits terminate in caps 2b made of hard metal which by means of suitable packings completely shut off the casing from the oil-filled space 1a. The metal cap 2b on the inlet side is also provided with a conduit 7, the purpose of which is described below.

A pressure vessel 8 contains petroleum from the strata under investigation, care being taken that the composition of the petroleum is that of the natural product. The pressure of the oil in the vessel 8 is measured by a pressure gauge 9. A pressure vessel 10 connected to a pressure gauge 11 is filled with water from the strata, and a pressure vessel 12 connected to a maonmeter 13 is filled with mineral oil, for example, lubricating oil. A container 14 is filled with compressed gas from a pressure flask 16. The aforesaid pressure vessels are connected with one another in the manner shown in FIGURE 1, so that the water and oil from the strata and the liquid in the rock core can be brought to the pressure existing in the strata. As it may happen that the pressure in the strata is higher than the gas pressure in the flask 16, mineral oil can be forced by means of a hand pump 17, after opening a valve 18, into the vessel 14 and in this manner the gas is compressed to a higher pressure.

In the conduit between the pressure vessels 8 and 10 there is a fluid measuring device 19 which may consist, for example, of a capillary flow meter having a differential pressure measuring device 20 connected therewith. Instead of a capillary flow meter, there may be used a device for the direct measurement of volume.

In the outlet conduit 6 there is a regulating valve 21. The liquids issuing from the rock core are released within the regulating valve approximately to atmospheric pressure and are fed to a gas-oil separator 22, in which the gas released from the oil separates from the liquid. The liquid constituents, which are initially oil alone but later oil and water, flow into a cooled receiver 23. The gas evolved passes into a gas pressure regulator 24 and then into the gas measuring and collecting vessels 25, 27 and 29, of which 25 and 27 are provided with temperature regulating jackets, and which vessels are provided with level regulating flasks 26, 28 and 30.

In order to measure the pressure drop across the rock core, and thus determine its effective permeability, during the flooding operation a differential pressure measuring device 31 suitable for use at high static pressures is connected to the conduits 5 and 6 for measuring small pressure differences.

The following operations are necessary in preparing for a flooding test. When the sample core to be tested has been enclosed within the casing it is completely saturated with salt water and the volume of its pores is determined by measuring the amount of liquid absorbed. The enclosed core saturated with salt water is then inserted into the pressure vessel 1 and the conduits 5, 6 and 7 are filled with salt water. The vessels 12 and 14 are brought to the desired pressure, the valves 34, 35 and 36 being closed and the valve 33 being opened. The space 1a between the enclosed core and the pressure vessel 1 is filled with oil and brought to slightly superatmospheric pressure by means of the piston pump 3. By cautiously opening the valve 36 the pressure in the vessel 10 and in the sample core is slowly raised, care being taken that the pressure in the space 1a of the container 1 is always kept higher. The regulating valve 21 is closed. After the pressure in the strata has been attained, liquid heated, for example, by electric heating means (not shown) to the temperature existing in the strata is pumped throught the jacket 1b of the vessel 1. When the rock core is heated throughout, the pressure being maintained at the previously adjusted value, saturation of the core with oil is commenced. The valve 33 is closed, and the valves 35 and 34 are opened one after the other. The regulating valve 21 is opened to such an extent that the strata oil from the vessel 8 penetrates into the rock core at the desired speed. The salt water thus expelled from the core is collected. The oiling treatment is continued until water no longer issues from the core. The control valve 21 is then closed and the separator 22 is connected. In order to recharge with salt water the portion of the conduit 5 which became filled with oil during the oiling treatment, the valves 34 and 35 are closed, and then the valve 33 is opened. The valve 7a at the outlet end of the pipe 7 is then cautiously opened somewhat to permit salt water from the vessel 10 to flow through the measuring device 19 and conduit 5 into a very narrow gap between the lower end of the core 2 and the opposing inner surface of the lower cap 2b, and thence into the conduit 7 and out through the valve 7a. The valve 7a is closed when clear salt water issues from the conduit 7, that is to say, after the oil in the conduit 5 has been expelled.

In this manner the preparatory operations are concluded and the flooding test itself can then be carried out. The regulating valve 21 is opened to such an extent that the desired quantity of salt water can penetrate into the rock core and the strata oil issuing from the core passes into the separator 22, in which the released gas separates from the rest of the oil which remains liquid. The levelling flask 26 is lowered so that subatmospheric pressure prevails in the gas measuring tube 25. The pressure regulator 24 ensures that subatmospheric pressure cannot exist in the separator 22. The spring loading of the pressure regulator is so adjusted that atmospheric pressure prevails in the separator. As soon as gas is released from the oil an almost inappreciable superatmospheric pressure is produced in the separator which suffices to operate the regulator so that the gas from the separator flows into the measuring tube 25. When the tube 25 is filled it is shut off and the measuring tube 27 is connected to the system. By raising the levelling vessel 26 the gas from the measuring tube 25 is passed into the collecting tube 29. The oil that remains liquid is collected in the cooled receiver 23. Immediately water breaks through, that is to say, as soon as a water drop appears on the outlet side of the regulator valve 21, the receiver is exchanged for a fresh one. If the flooding operation were continued after the breaking through of water, the ratio by volume of water to oil would continuously increase in favour of the water. The receiver 23 is exchanged at regular intervals and the quantities of oil and water expelled are measured in a suitable manner. Throughout the flooding operation the regulator valve 21 is so adjusted that the desired quantity of salt water flows in unit time through the capillary flow meter 19. By means of the differential pressure measuring device 31 the pressure drop across the rock core is continually determined. As the differential pressure measuring device 31 there must be used one which operates practically without any changes in volume in the measuring chambers even when the pressure varies.

As has been stated above and will be understood from the foregoing description, the core casing is of paramount importance in carrying out the flooding tests. The use of an easily fusible alloy of bismuth and tin for making the casing enables the flooding to be carried out under the very high pressures and temperatures existing in the strata. However, owing to the low strength of the easily fusible alloy it is not possible at the upper and lower ends of the core casing to effect a tight packing directly between the metal casing and the connecting caps.

Accordingly, the casing is connected in a liquid-tight manner to the connecting caps 2b provided with conduits, as shown in FIGS. 2 and 3:

The metal casing 2a is conically tapered at each end, and grooves d are cut into the conical surfaces c. By means of a suitable artificial plastic material e brass rings f having internal conical surfaces also provided with grooves g are cemented on to the conical ends of the casing 2a. In order to produce a metallic connection between the casing 2a and the brass rings f the space m between them is joined by a soldered seam h. The same easily fusible alloy is used as solder. The brass rings are provided with a circumferential groove $k$ in which is inserted a packing ring $l$. The connecting caps $2b$ are pushed directly over the packing rings and completely shut off the rock sample from the high external pressure.

The liquid constituents of the crude oil separate in the receivers 22 and 23 from the gaseous components under the normal pressure prevailing therein. In order to bring about a thorough separation of the liquid and gaseous constituents, the gases are sacked into the gas flasks 25, 27 and 29 under slightly reduced pressure. However, the reduced pressure should not act upon the gas-oil separator 22, 23, in order to avoid evaporating readily boiling constituents of the crude oil and their being carried away with the gases. For this purpose there is provided between the separator 22, 23 and the gas flasks 25, 27 and 29 a pressure regulator 24 which enables a constant pressure to be maintained in the separator when a slightly reduced pressure is produced in the gas flasks by lowering the levelling vessel 26, 28 or 30.

Advantageously, the pressure regulator is constructed as shown in FIG. 4. A cup-like metal container 41 is closed by means of a very thin gas-tight diaphragm 42. At the centre of the diaphragm is fixed a loading weight 43 to which is connected a tension spring 44. The tension of this spring is adjustable by moving a pin 45 mounted on a bracket 46. At the centre of the diaphragm on its underside is fixed a small plate 47 of elastic material. When the diaphragm is in its position of rest, the plate 47 closes a sharp edged nozzle 48 at the end of a gas conduit 49. The gas flows in through a conduit 40. From the preceding description it will be understood that, when the predetermined pressure is exceeded in the container 41, the diaphragm 42 rises, so that the passage for the gases through the nozzle 48 into the conduit 49 is opened. A desired reduced pressure can exist in a vessel connected to the conduit 49, provided that the gas entering the container 41 is sucked away in a quantity sufficient to maintain the predetermined pressure in the container.

I claim:

1. A method of carrying out a flooding test on a strata oil-containing rock core sample taken from an oil-bearing rock formation comprising enclosing the rock sample within a closely contacting casing of yieldably plastic soft metal, introducing the casing containing the sample within a fluid medium, maintaining said fluid medium throughout the test at a higher pressure than the pressure within the sample core so that said casing closely and conformably contacts said core, bringing the pressure and temperature within the core and the temperature of said fluid medium to the pressure and temperature existing in said rock formation, introducing a liquid into said core under sufficient pressure to force the strata oil from the pores of said core, and collecting said extracted oil.

2. Apparatus for carrying out a flooding test on a sample of rock core taken from an oil-bearing rock formation comprising a closely contacting liquid impermeable casing for enclosing the core, said casing being so yieldably plastic under the temperature and pressure conditions of the test as to conform itself to maintain close contact with the core during test pressure and temperature changes, means for mounting said casing containing the core within a surrounding fluid medium, means for maintaining said medium throughout the test at a higher pressure than the pressure within said core, means for bringing the pressure and temperature within the core and the temperature of said fluid medium to the pressure and temperature of the rock formation, means for introducing a liquid into the casing at sufficient pressure to permeate the core and expel the oil therefrom, and means for collecting the expelled oil.

3. Apparatus as claimed in claim 2, in which the said casing is made of a low melting metal or alloy.

4. Apparatus as claimed in claim 2, in which the said casing is made of a bismuth-tin alloy.

5. Apparatus for carrying out a flooding test on a sample core taken from an oil-bearing rock formation, which comprises a sample core enclosed within a closely contacting casing of yieldably plastic soft metal, said casing being conically tapered at each end with grooves in the conical surfaces, a hard metal ring having correspondingly conically tapered and grooved internal surfaces cemented to each conically tapered end of the casing, a cap fitted over the ring at each end of the casing with the interposition of a fluid-tight packing, said casing having an inlet for flooding liquid and an outlet for the oil expelled, and a pressure vessel which is adapted to contain the said casing and core and a fluid medium surrounding the casing provided with means for heating the fluid medium within it.

6. Apparatus for carrying out a flooding test on a sample core taken from an oil-bearing rock formation, which comprises a sample core enclosed within a closely contacting casing of yieldably plastic soft metal, said casing having an inlet for flooding liquid and an outlet for the oil expelled, a pressure vessel which is adapted to contain the said casing and core and a fluid medium surrounding the casing provided with means for heating the fluid medium within it and means for supplying crude oil and water from the rock formation under pressure to the inlet of the casing, a separator communicating with the outlet of the casing for separating liquid and gas from the oil expelled from the core, a receiver for collecting the separated liquid, means for collecting the separated gas, and a pressure regulator connected between the separator and the gas collecting means.

7. Apparatus for carrying out a flooding test on a sample core taken from an oil-bearing rock formation, which comprises a sample core enclosed within a closely contacting casing of yieldably plastic soft metal, the said casing having an inlet for flooding liquid and an outlet for the oil expelled, a pressure vessel which is adapted to contain the said casing and core and a fluid medium surrounding the casing and is provided with means for heating the fluid medium within it, a vessel for crude oil communicating with the inlet of the casing, a vessel for water from the rock formation, a liquid flow meter through which the latter vessel communicates with the crude oil vessel and with the pressure vessel, an oil vessel communicating with the water vessel, a compressed air vessel communicating with the oil vessel, a differential pressure gauge connected across the outlet and inlet ends of the casing, a pump for supplying liquid under pressure to the pressure vessel for the encased sample core, a separator communicating with the outlet of the casing for separating liquid and gas from the oil expelled, a receiver for collecting the separated liquid, gas-collecting vessels provided with liquid-levelling adjusting means for regulating the pressure in the said vessels, and a pressure regulator connected between the separator and the gas collecting vessels for maintaining a constant pressure in the separator.

References Cited in the file of this patent

UNITED STATES PATENTS

| | | |
|---|---|---|
| 2,254,006 | Exline | Aug. 26, 1941 |
| 2,676,485 | Morgan | Apr. 27, 1954 |
| 2,705,418 | Reichertz et al. | Apr. 5, 1955 |
| 2,769,335 | Moennig et al. | Nov. 6, 1956 |

OTHER REFERENCES

Publication, Bureau of Mines RI4004 "Method for Determining Simultaneously the Oil and Water Saturations of Oil Sands," December 1946. Pages 2, 3, 4, 5 and FIGS. 1 and 2. Copy in 73-153.